United States Patent (10) Patent No.: US 8,918,892 B2
Harris (45) Date of Patent: Dec. 23, 2014

(54) ADJUSTABLE RESOLUTION MEDIA FORMAT

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 0 days.

(21) Appl. No.: 13/607,536

(22) Filed: Sep. 7, 2012

(65) Prior Publication Data

US 2012/0331306 A1 Dec. 27, 2012

Related U.S. Application Data

(63) Continuation of application No. 12/365,861, filed on Feb. 4, 2009, now Pat. No. 8,266,709.

(51) Int. Cl.
*G06F 7/04* (2006.01)
*H04N 21/442* (2011.01)
*H04N 21/8355* (2011.01)
*H04L 9/16* (2006.01)
*H04N 7/16* (2011.01)
*H04N 21/81* (2011.01)
*H04N 21/4335* (2011.01)
*H04N 21/432* (2011.01)

(52) U.S. Cl.
CPC ........... *H04N 7/162* (2013.01); *H04N 21/8355* (2013.01); *H04L 2209/603* (2013.01); *H04L 9/16* (2013.01); *H04N 21/8113* (2013.01); *H04N 21/4335* (2013.01); *H04N 21/4325* (2013.01); *H04N 21/44204* (2013.01)
USPC ................... 726/26; 726/33; 380/44; 380/45

(58) Field of Classification Search
None
See application file for complete search history.

(56) References Cited

U.S. PATENT DOCUMENTS

| | | | |
|---|---|---|---|
| 7,088,823 B2 * | 8/2006 | Fetkovich | 380/255 |
| 7,395,321 B1 | 7/2008 | Oz et al. | |
| 7,460,668 B2 | 12/2008 | Grab | |
| 7,555,785 B2 | 6/2009 | Levy | |
| 7,730,184 B2 | 6/2010 | Camp, Jr. | |
| 2001/0036292 A1 * | 11/2001 | Levy et al. | 382/100 |
| 2003/0216824 A1 | 11/2003 | Chu et al. | |
| 2004/0199855 A1 | 10/2004 | Heylen | |
| 2004/0267533 A1 | 12/2004 | Hannigan | |
| 2005/0262568 A1 * | 11/2005 | Hansen et al. | 726/26 |
| 2006/0020825 A1 * | 1/2006 | Grab | 713/193 |
| 2006/0074851 A1 | 4/2006 | Nagai et al. | |
| 2006/0136340 A1 | 6/2006 | Park | |
| 2006/0253713 A1 * | 11/2006 | Terranova et al. | 713/194 |
| 2007/0079130 A1 | 4/2007 | Vandewater | |
| 2007/0253552 A1 * | 11/2007 | Garcia et al. | 380/201 |
| 2008/0181449 A1 | 7/2008 | Hannigan | |
| 2008/0270804 A1 | 10/2008 | Terranova | |
| 2009/0154836 A1 * | 6/2009 | Morales et al. | 382/298 |

* cited by examiner

*Primary Examiner* — Kaveh Abrishamkar
*Assistant Examiner* — Robert Leung
(74) *Attorney, Agent, or Firm* — Law Office of Scott C. Harris, Inc.

(57) ABSTRACT

A play limit is set for a media file. The play limit can be, for example a date, or a number of times that the file has been played. When the file exceeds the play limit, the quality of the file playing is degraded.

9 Claims, 1 Drawing Sheet

ADJUSTABLE RESOLUTION MEDIA FORMAT

CROSS-REFERENCE TO RELATED APPLICATIONS

This application is a continuation application of U.S. Ser. No. 12/365,861 filed Feb. 4, 2009, now U.S. Pat. No. 8,266,709 issued Sep. 11, 2012, the disclosure of which is herewith incorporated by reference in their entirety.

BACKGROUND

Compressed media may include compressed audio, compressed video, or other forms of media.

One popular compressed media is the so-called MP3 music format. Conventional MP3 format allows a variable audio quality depending on the number of bits that are assigned to carry the audio. For example, a smaller bit rate produces a more coarse approximation of the final signal. This provides a smaller file size as a tradeoff for a lower quality audio playback. A larger bit rate provides a larger file, but more closely approximates the way in which the actual signal is played. Variable bit rates may change the bit rate from area to area.

The sample rate of MP3s may also change. A standard MP3 sample may be 44.1 kHz, the same sampling rate is used in a conventional CD. In addition, however, other sampling rates can exist. People conventionally use very low sampling rate, such as 8 kilohertz for simple spoken audio. On the other hand, professional music may be sampled at 96 kHz or more.

In general, a smaller file means less accurate playback; a larger file means more accurate playback.

The MP3 file uses a header with various parameters about the file part. The header is followed by a data area. The header and data area together is called a frame. Each frame may include a specified amount of data, and may have data for any desired amount of time. In a typical MP3 file, the frame typically might around or somewhat less than a second.

Techniques of restricting play and/or transfer of media signals are known. Digital rights management on the MP3s have been met with significant resistance.

SUMMARY

The present application recognizes that a compressed media signal, such as an MP3 file, once transferred, is good and playable forever.

The present application describes a technique for storing and processing compressed media information in a way that controls the media to be read back, and stores information that is based on the number of times the data has been read. According to another embodiment, the file includes information indicative of a number of times that the media can be read back or played the media without degradation of the contents of the media. After that number of times, the media playback is automatically degraded by the playing system.

DETAILED DESCRIPTION

Figure 1:
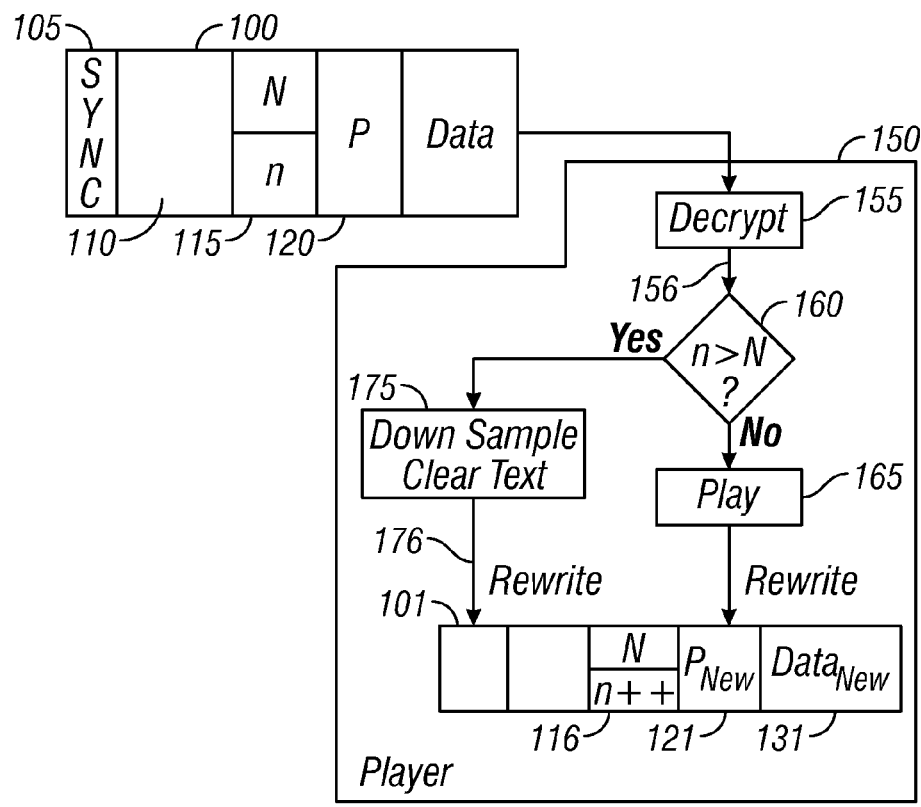
FIG. 1 shows a first embodiment which rewrites all or part of the file each time the file is played and the rewritten file or part indicates that the file has been played an additional time.

An embodiment is shown with reference to the figures. FIG. 1 shows a compressed audio file 100, for example an MP3 file. While the present embodiment refers to audio files, it should be understood that the embodiments are intended to also apply to compressed video files, as well as compressed files that include information indicative of any item that can be played back from a stored form.

The file 100 may include, as conventional, a sync area 105, followed by a control area 110 which can include identification information, layer information, bit rate and frequency information as well as any other information that is used to decode and play the eventual information.

The files of the embodiments may include play limits. After the play limits have been exceeded, the quality of the media stored on the file can be degraded.

In a first embodiment, the file may also store the number of allowable times that the file can be played, as play times information 115. The play times may include two parts: N indicating a total a number of times that the file can be played without degradation, as well as n indicating how many times the file has been played.

In one embodiment, the variable n may be based on the player, where each file can be played N times on a specific player. The file can be moved to another player and played another N times. The variable N and/or n may also store information about the player(s) that have played the file. In this embodiment, the value n includes a serial number or other unique identifier indicating the player.

An embodiment also includes a protection layer shown as P 120. The protection layer may include one or more encryption codes, used for decrypting encrypted information stored within the data portion 130.

The actual data area 130 which may include encrypted audio information, encrypted in a compressed format. Any compression technique, such as Huffman coding or MPEG coding, may be used for the compression. In one embodiment, the signal is MP3-encoded.

In operation, the signal 100 is received by a player module 150. The player module will first, at 155, use the information in the protection area 120 to decrypt the encrypted audio. This decryption operation 155 produces in essence clear text music at 156. This clear text music, however, is still compressed.

At 160, a test is made to determine if the value n>N for this specific player, that is whether the number of times the music file has been played on this player is greater than the threshold of total times that the file can be played. If not, then the file is played normally at 165.

Note that even if the value n is greater than one—e.g., the file has been played before, it might not have been played before on this specific player. For example, if the file has been played on some other player, n might be 2, and the serial number of that other player is stored as part of the 2. However, playing the file on a different player still starts at n=1. This produces a special advantage. A user can download the file, and play it and share it. Even if the file is close to the end of the number of times it can be played, sharing the file to a new player always restarts the number of allowable plays to the set number.

After playing at 165, the file is rewritten to a new file 101. The new file 101 has n incremented, and P has been changed to a new key. According to an embodiment, the value of P 120 is tied to the value of n 115. That is, P 120 can only be used for decrypting the data when the value n is a certain value. When n is incremented, to n+1, the previous value P cannot work to decrypt the data 130. This may use, for example, a hardware checksum detector to require n=x before P can be used. Alternatively, the value n can be used as part of the decryption key and data will not be decryptable unless n is correct.

In one embodiment, the value of P for n=1 includes decryption keys for n=1, 2, 3, 4 and 5 (assuming 5 plays). The key for n=1 is used to decrypt when n is one. When n is incremented to n=2, the new value of P includes decryption keys only for 2, 3, 4 and 5, that is, the decryption value for n=1 has been removed once n is incremented to 2. P may also include information for encryption at n=1 to 5, for example.

The file is rewritten with the new values after an increment. In the embodiment where multiple encryption keys are stored, the encryption keys for the already-passed values can be removed in the rewritten file.

Therefore, at 170, the new data structure is formed where the value of n has been incremented to a new value 116, and a new value of P 121 has been formed that corresponds to the new value of n 116. The data 130 is re-encrypted with a new encryption key to form new encrypted data 131. The new encrypted data can be decrypted using information in the new value P, but cannot be encrypted using the old value P120. That new value of P is keyed to the new value of n, and allows the new P to be used to decrypt the new encrypted data 131.

The sync signal and header 110 may be the same, but the rest of the music signal 101 may be changed.

Another embodiment may operate without encryption or with a constant encryption key that does not change.

If n is found to be greater than N at 160, flow passes to a new direction, where the decrypted cleartext 175 is downsampled by some value. For example, the already compressed audio or video may be further compressed according to a more aggressive compression scheme so that the played-back file has lower quality. The downsampling at 175 makes a smaller file, but decreases the resolution of the signal, and hence decreases the amount of information from that file.

In one embodiment, each downsampling may be by 10%, 20%, or some other value. The downsampled file 176 is a reduced quality file. It can still be played on the player, but has less quality than the other file. The value 176 is rewritten to form the new data part 131. The new signal includes new data, a new encryption key, and a new value of n.

In this embodiment, after the file has been played more than N times, its resolution begins to suffer on subsequent playings. Eventually, the file quality will degrade to the point that it will sound bad. However, the file can still be played, for example to remind the user if they like the file, or just to avoid having the user feel cheated by no longer being able to play the file.

This embodiment may be used for a preview mode where the files can be distributed and played by any users as a preview, e.g., do they like the file contents. Another use of this embodiment may allow selling a media file that can only be used for a limited time for a limited price. After that time, (number of plays, or in another embodiment on a date), the file quality begins to degrade.

The recoding of the data files produces a new data packet 101 that replaces the previous data packet 100. Values of the data packet are also changed. According to one embodiment, the players include structure, e.g., hardware or software, that forces them to carry out this information changing. Moreover, the incrementing of the value n may be carried out in hardware. Since the encryption key 120 is keyed to the value of n, this may prevent the media from being played by the player unless the entire process is followed by decryption, variable n incrementing, encryption key etc. This prevents playing the file unless the variable is incremented, and unless the quality of the file is reduced if necessary.

The above has described one particular form of encryption, however it should be understood that other encryption forms may similarly be used, and more sophisticated encryption forms such as Blu-Ray encryption may be used on this disc.

Moreover, the operation can be carried out during streaming, so that one or more frames is read, played at 165, and then re-encoded at 170 while the next frame is re-encrypted and re-encoded.

Another embodiment stores the read-limited medium information on a read-only disk, such as a CD or DVD. The variable information n is stored in the player in this embodiment. In this embodiment, the data 130 may not be re-encrypted each time, since the data can only be read from the disk, and new data cannot be stored on the disk. The disk may include encrypted information that is decrypted by a decryption code, either on the disk itself, in the player, or obtained some other way.

Another embodiment may use the techniques above without encryption, just relying on the player to carry out the read protection.

Figure 2:
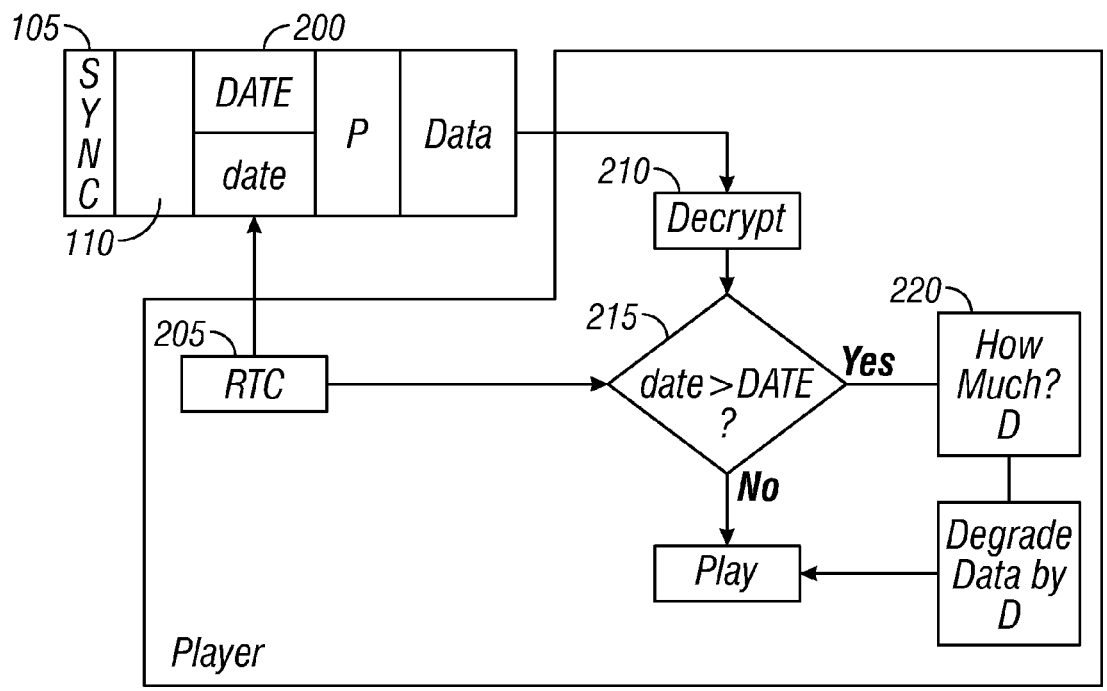
FIG. 2 shows a second embodiment, in which the player determines a date and compares that with a date in the file.

The above embodiment refers to an embodiment which limits the number of times that the media can be played. Another embodiment uses date protection in place of or in addition to the number of times played protection. FIG. 2 illustrates this embodiment one in which many of the values are the same within the data frame 200. However, instead of the value n, this system uses a system of dates, where the media stores the value DATE, after which the file begins degrading. The value DATE represents the real time from a real time clock 205 of the playing process. As in other embodiments, the playing process may decrypt at 210. At 215, the system determines if the current date is before or after the set value DATE.

After the set DATE, the contents of the file begin degrading. The amount of time after the set date in the variable DATE is used to set the amount of degradation of the file at 220. At 230, the file is degraded by the amount determined at 220: the amount by which the current date exceeds the set variable DATE.

In this embodiment, the file need not be rewritten. The current date is a fixed value that is received from the real time clock 205 of the player. The file playing is degraded in proportion to the amount by which the current date is past the variable date. In one embodiment, each day past the date set causes further degradation in the played contents.

In both the first and second embodiments, the data can also be stored without encryption, thereby avoiding the decryption.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the media can be video such as MPEG or avi or windows media video. Different forms of media degradation and different forms of the degradation schedule are contemplated.

Also, the inventor intends that only those claims which use the words "means for" are intended to be interpreted under 35

USC 112, sixth paragraph. Moreover, no limitations from the specification are intended to be read into any claims, unless those limitations are expressly included in the claims.

The playing devices described herein may be any kind of electronic devices, e.g., a computer, either general purpose, or some specific purpose computer such as a dedicated media player, e.g, an IPOD™ or DVD or Bluray™ player, or a playing function within a special purpose computer such as a PDA, cellphone, or laptop.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended.

What is claimed is:

1. A player for playing media, comprising:
a memory;
a media player, including a processor, which reads first information indicative of a first media file to be played from the memory;
said media player also reading second information indicative of a current play value that defines current information about said first media file;
said media player also reading a decryption code from the first media file, and first checking said decryption code to determine if a sum value within said decryption code agrees with said current play value, and using said decryption code to decrypt the second information only if said decryption code agrees with said current play value, and to decrypt said second information based on said decryption code, where said media player cannot operate to use the decryption code to read from the first media file to decrypt said first media file unless the decryption code agrees with said current play value;
after said reading, said media player operating for changing said current play value to a new current play value and reencrypting said second information with a new decryption code that is associated with said new current play value to create rewritten second information, and writing said rewritten second information and said new decryption code and said new current play value as a first new media file in place of the first media file, wherein said current play value defines a number of times that the first media file has been played.

2. The player as in claim 1, wherein media player degrades a quality of said file during said reencrypting to form a degraded quality file, when said current play value is beyond a limit.

3. The player as in claim 2, wherein said degraded quality file is smaller in size than an original file.

4. The player as in claim 2, wherein said media player creates the degraded quality file by downsampling the first media file in a way that reduces a quality of the first media file and a size of the first media file.

5. A computer system, comprising:
a storage part that stores a first media file to be played;
a processor, reading first information from said storage part indicative of a current play value that defines current information about said first media file;
and changing said current information based on an operation of said processor to a changed current information,
said processor playing said first media file, and
said processor changing said first media file to a new first media file if said current information has a specified value, and not changing said first media first if said current information does not have the specified value, and
said processor preventing playing said first media file if said current information is not verified, wherein said current information defines a number of times that the first media file has been played, wherein, said processor also reading a decryption code from the first media file, and first checking said decryption code to determine if a sum value within said decryption code agrees with said current play value, and said verified comprises using said decryption code to decrypt the first information only if said decryption code agrees with said current play value, and to decrypt said information based on said decryption code, where said processor cannot operate to use the decryption code to read from the first media file to decrypt said first media file unless the decryption code agrees with said current play value;
said processor operating, after said reading, for changing said current play value to a new current play value and reencrypting said first information with a new decryption code that is associated with said new current play value to create rewritten first information, and writing said rewritten first information and said new decryption code and said new current play value as a first new media file in place of the first media file, wherein said current play value defines a number of times that the first media file has been played.

6. The system as in claim 5, wherein said processor changes said current information after said reading.

7. The system as in claim 5, wherein said processor changes said first media file by degrading a quality of said file to form a degraded quality file, when said current information is beyond a limit.

8. The system as in claim 7, wherein said degraded quality file is smaller in size than an original file.

9. The system as in claim 7, wherein said playing part creates the degraded quality media file by downsampling the first media file in a way that reduces a quality of the first media file and a size of the first media file.

* * * * *